US009769193B2

(12) United States Patent
Akcin (10) Patent No.: US 9,769,193 B2
(45) Date of Patent: Sep. 19, 2017

(54) ADVANCED SECURITY FOR DOMAIN NAMES

(71) Applicant: Microsoft Technology Licensing, LLC, Redmond, WA (US)

(72) Inventor: Mehmet Akcin, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 103 days.

(21) Appl. No.: 14/742,945

(22) Filed: Jun. 18, 2015

(65) Prior Publication Data

US 2016/0373479 A1  Dec. 22, 2016

(51) Int. Cl.
*H04L 29/06* (2006.01)
*H04L 29/12* (2006.01)
*H04L 29/08* (2006.01)

(52) U.S. Cl.
CPC ...... *H04L 63/1433* (2013.01); *H04L 61/1511* (2013.01); *H04L 61/2007* (2013.01); *H04L 61/302* (2013.01); *H04L 63/083* (2013.01); *H04L 63/1483* (2013.01); *H04L 67/02* (2013.01); *H04L 67/10* (2013.01)

(58) Field of Classification Search
CPC .................................................. H04L 63/1433
See application file for complete search history.

(56) References Cited

U.S. PATENT DOCUMENTS

| 7,761,583 | B2 | 7/2010 | Shull et al. |
| 8,032,632 | B2 | 10/2011 | Blinn et al. |
| 8,380,851 | B2* | 2/2013 | McCarthy ......... G06F 17/30902 709/217 |
| 8,544,069 | B1 | 9/2013 | Subbiah et al. |
| 8,751,685 | B2 | 6/2014 | Parsons |
| 8,904,519 | B2 | 12/2014 | Essawi et al. |
| 8,910,245 | B2 | 12/2014 | Kondamuru et al. |
| 9,426,171 | B1* | 8/2016 | Jezorek ............... H04L 63/1433 |

(Continued)

FOREIGN PATENT DOCUMENTS

| CN | 103685599 A | 3/2014 |
| WO | 2013010585 A1 | 1/2013 |

OTHER PUBLICATIONS

"International Search Report and Written Opinion Issued in PCT Application No. PCT/US2016/037727", Mailed Date: Sep. 13, 2016, 11 Pages.

(Continued)

*Primary Examiner* — Kambiz Zand
*Assistant Examiner* — Thanh Le
(74) *Attorney, Agent, or Firm* — Liang IP, PLLC (57) ABSTRACT

Various techniques for improving security of domain name records are disclosed herein. In one embodiment, a method includes receiving a request to modify a domain name record containing a first domain name server to containing a second domain name server. In response to the received request, the first and second domain name servers are individually queries for corresponding first and second security records. The method can also include receiving the first and second security records from the first and second domain name servers, respectively and determining whether to allow the domain name record to be modified based on a comparison of the first and second security records.

20 Claims, 8 Drawing Sheets

(56) References Cited

U.S. PATENT DOCUMENTS

| | | | |
|---|---|---|---|
| 2005/0267968 A1* | 12/2005 | Fearing | H04L 29/12066 709/224 |
| 2009/0049198 A1 | 2/2009 | Blinn et al. | |
| 2011/0055331 A1 | 3/2011 | Adelman et al. | |
| 2013/0326084 A1 | 12/2013 | Huang et al. | |
| 2014/0059208 A1 | 2/2014 | Yan et al. | |
| 2014/0283106 A1* | 9/2014 | Stahura | G06Q 10/06 726/27 |
| 2015/0058999 A1* | 2/2015 | McPherson | H04L 61/1511 726/26 |

OTHER PUBLICATIONS

"How to Change the Name Servers for Your Domain | 123-reg", Retrieved From <<https://web.archive.org/web/20140929130336/http://www.123-reg.co.uk/support/answers/how-do-i-change-the-nameservers-for-my-domain-name-1206/>>, Retrieved on: Aug. 31, 2016, pp. 1-2.

"Transfer Secret—Wikipedia the free encyclopedia", Retrieved From <<https://en.wikipedia.org/w/index.php?title=Transfer secret&oldid=648992578>>, Retrieved on: Aug. 31, 2016, pp. 1-2.

Mitchell, Anicas, "How to Set Up Gmail with Your Domain on DigitalOcean | DigitalOcean", Retrieved From <<https://www.digitalocean.com/community/tutorials/how-to-set-up-gmail-with-your-domain-on-digitalocean>>, Retrieved on: Aug. 31, 2016, 13 Pages.

Wellington, Nominum B., "Secure Domain Name System (DNS) Dynamic Update; rfc3007.txt", In Joint Collaborative Team on Video Coding of ISO/IEC JTC1/SC29/WG11 and ITU-T SG.16, Chapters 2-4, Nov. 1, 2000, 10 Pages.

"Change Nameservers to Set up Office 365 with any Domain Registrar", Retrieved on: May 20, 2015, Available at: https://support.office.com/en-us/article/Change-nameservers-to-set-up-Office-365-with-any-domain-registrar-a8b487a9-2a45-4581-9dc4-5d28a47010a2.

"Overview of DNSSEC", Published on: Feb. 11, 2014, Available at: https://technet.microsoft.com/en-in/library/jj200221.aspx.

Tero, Paul, "Technical Requirements for Authoritative Name Servers", Published on: Nov. 14, 2013, Available at: https://www.iana.org/help/nameserver-requirements.

"Introduction to DNS: Explaining the Dreaded DNS Delay", Published on: May 25, 2011, Available at: http://www.smashingmagazine.com/2011/05/25/introduction-to-dns-explaining-the-dreaded-dns-delay/.

"Glue Records", Published on: Feb. 25, 2009, Available at: http://www.webdnstools.com/dnstools/articles/glue_records.

* cited by examiner

ADVANCED SECURITY FOR DOMAIN NAMES

BACKGROUND

In a computer network such as the Internet, users can identify web servers, email servers, or other resources by alphanumerical domain names. However, routers, switches, and other network services or devices identify such resources by numerical IP addresses. A domain name system facilitates operations of such computer networks by providing a translation service between the alphanumeric domain names and numerical IP addresses. For example, a domain name server can first translate the domain name "www.example.com" to the IP address "192.168.0.1." Routers, switches, or other computer services or devices can then access resources associated with this domain name based on the IP address.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A domain name system ("DNS") typically includes multiple authoritative servers and caching servers. The authoritative servers are configured to return specific domain name translations in response to DNS queries from caching servers. Caching servers are configured to retrieve the translations from the authoritative servers and store (or "cache") the retrieved translations for a period of time. To resolve a particular domain name (e.g., "www.example.com"), a caching server typically queries a top-level domain server (e.g., a ".com" nameserver) for name server ("NS") records that each contains, inter alia, a URL of an authoritative server for the domain name. Based on the NS record, the caching server can then locate the authoritative server(s) to retrieve an IP address (e.g., "192.168.0.1") corresponding to the domain name (e.g., "www.example.com").

Unfortunately, the foregoing name resolution process is vulnerable for domain name hijacking attacks. Typically, NS records for a particular domain name is configured by a network registrar (e.g., GoDaddy) upon a domain owner's request. The network registrar also allows modification of the NS records upon presentation of passwords, answers to secret questions, or other credentials. However, through social engineering (e.g., looking up a domain owner's Facebook page), a unauthorized party can obtain answers to places of birth, mother's maiden name, high school previously attended, or other typical secret questions. Based on the answers obtained, the unauthorized party can request a network registrar to modify the NS records from containing URLs of real authoritative servers to URL's of fraudulent authoritative servers. The fraudulent authoritative servers can then direct network traffic to/from the domain name to fraudulent servers configured for phishing or other illicit activities.

Several embodiments of the disclosed technology can at least reduce, if not eliminate, the risk of unauthorized modification of NS records associated with a domain name. In certain embodiments, a DNS server (e.g., a top-level domain server) can receive a request to modify one or more NS records associated with a domain name from containing a URL of a first domain nameserver to a second, and potentially malicious, domain nameserver. In response to receiving the request, the DNS server individually queries the first and second domain nameservers for a security record containing, for example, a random number, a hash code, or other suitable types of data. The DNS server can then compare the received security records from the first and second domain nameservers. If the security records at least substantially match each other, the DNS server can allow modification of the NS records. Otherwise, the request can be denied, and optionally an alarm can be raised for the denied request. A hijacker is unlikely to have access to the first domain nameserver or the security record contained thereon. Thus, the disclosed technology can protect the NS records on the DNS server from unauthorized modification even when the hijacker possesses answers to certain secrete questions or other credentials of the domain owner through social engineering or other techniques.

DETAILED DESCRIPTION

Certain embodiments of systems, devices, components, modules, routines, and processes for managing security of name server records are described below. In the following description, specific details of components are included to provide a thorough understanding of certain embodiments of the disclosed technology. A person skilled in the relevant art will also understand that the disclosed technology may have additional embodiments or may be practiced without several of the details of the embodiments described below with reference to FIGS. 1-8.

As used herein, the term "domain name system" or "DNS" generally refers to a computer system configured to translate alphanumerical domain names into numerical IP addresses to effect communications in a computer network. A domain name system can include one or more operatively coupled DNS servers containing a database of domain name translations. Example DNS servers can include authoritative servers and caching servers organized into a hierarchy. One example DNS computing framework is described below with reference to FIG. 1.

An "authoritative server" generally refers to a DNS server specifically configured to return authoritative domain name translations for particular domain names in response to DNS queries. For example, an authoritative server can contain a mapping of URL of a domain to an IP address specifically defined by a domain administrator or other authorized entities. In another example, an authoritative server can also contain a mapping of a host portion of an email address (e.g., "@gmail.com") to an IP address. In a further example, an authoritative serer can also contain name server ("NS") records of other authoritative servers to whom resolution authority has been delegated. Authoritative servers for a domain or host may be configured by DNS hosting companies or network registrars, such as, for example, Amazon, GoDaddy, or Verisign.

A "caching server" generally refers to a DNS server configured to resolve a domain name of a target domain by recursively querying authoritative servers. For instance, each part of the URL "www.example.com" has a specific DNS server (or group of servers) that is authoritative. A root server can contain network addresses of authoritative servers for top-level domains such as ".com," ".net," or ".org." In one example resolution operation, a caching server can first query the root server for network addresses of authoritative servers for the ".com" domain. Then, the caching server queries the ".com" authoritative server for network addresses of authoritative servers for "example.com" domain. The caching server can then query the authoritative servers for the "example.com" domain for an IP address associated with the domain name "www.example.com."

Also used herein, the term a "DNS query" generally refers to an electronic data package representing a request from, e.g., a caching server to an authoritative server for retrieving records. For example, an A-type DNS query is a request for retrieving a 32-bit IPv4 address of a target domain name. An AAAA-type DNS query is a request for retrieving a 128-bit IPv6 address of a target domain name. An NS-type query is a request for retrieving a URL of an authoritative server for a target domain name. As described in more detail below, a security query can include a request for retrieving a security record from an authoritative server in accordance with embodiments of the disclosed technology.

A DNS server can also contain one or more DNS records. One example type can include NS records that each contains a URL of an authoritative server for a particular domain or subdomain name. For instance, a ".com" authoritative server can have example NS records associated with the domain name "www.example.com" as follows:

| Owner name | Class | Record type | Target Name |
| --- | --- | --- | --- |
| www.example.com | IN | NS | ns1.example.com |
| www.example.com | IN | NS | ns2.example.com |

As shown above, the example NS records can each include four fields: owner's name (i.e., "www.example.com"), class (i.e., "IN" indicating Internet), record type (i.e., "NS"), and target name (e.g., ns1.example.com). According to the above example NS records, authoritative servers for the domain name "www.example.com" are located at URLs "ns1.example.com" and "ns2.example.com." In other examples, the NS records can also include additional and/or different fields.

In accordance with embodiments of the disclosed technology, another example DNS record type can include a security query record containing, for example, a URL or IP address at which a security record associated with a domain name can be located. Example security query records can be as follows:

| Authoritative server | Class | Record type | Security record location |
| --- | --- | --- | --- |
| ns1.example.com | IN | TXT | 192.168.1.5 |
| ns2.example.com | IN | TXT | 192.168.1.6 |

As shown above, the example security query records can each include four fields: authoritative name server (e.g., "ns1.example.com"), class (i.e., "IN" indicating Internet), record type (i.e., "TXT" or other suitable types), and security record location (e.g., "192.168.1.5"). In the above examples, a security record associated with the authoritative server "ns1.example.com" is located at an IP address of "192.168.1.5," and another for the authoritative server "ns2.example.com" is located at an IP address of "192.168.1.6."

Also used herein, a "security record" generally refers to a DNS record that contains security data. In certain embodiments, security data can include a text string, a hash code, a numerical value, or other suitable types of data. The security data can be user configured, randomly generated, generated based on historical values, or derived via other suitable techniques. In one embodiment, the security data can be static, i.e., not varying over time. In other embodiments, the security data can vary continuously or periodically. For example, the security data can be a random integer number from 1 to 10,000 that changes continuously, every second, every minute, or in other suitable time intervals. In another example, the security data can be a text string (e.g., "Hello World!") configured by an administrator. In further examples, the security data can include floating type numbers, photo files, sound files, or any other suitable types of data.

Figure 1:
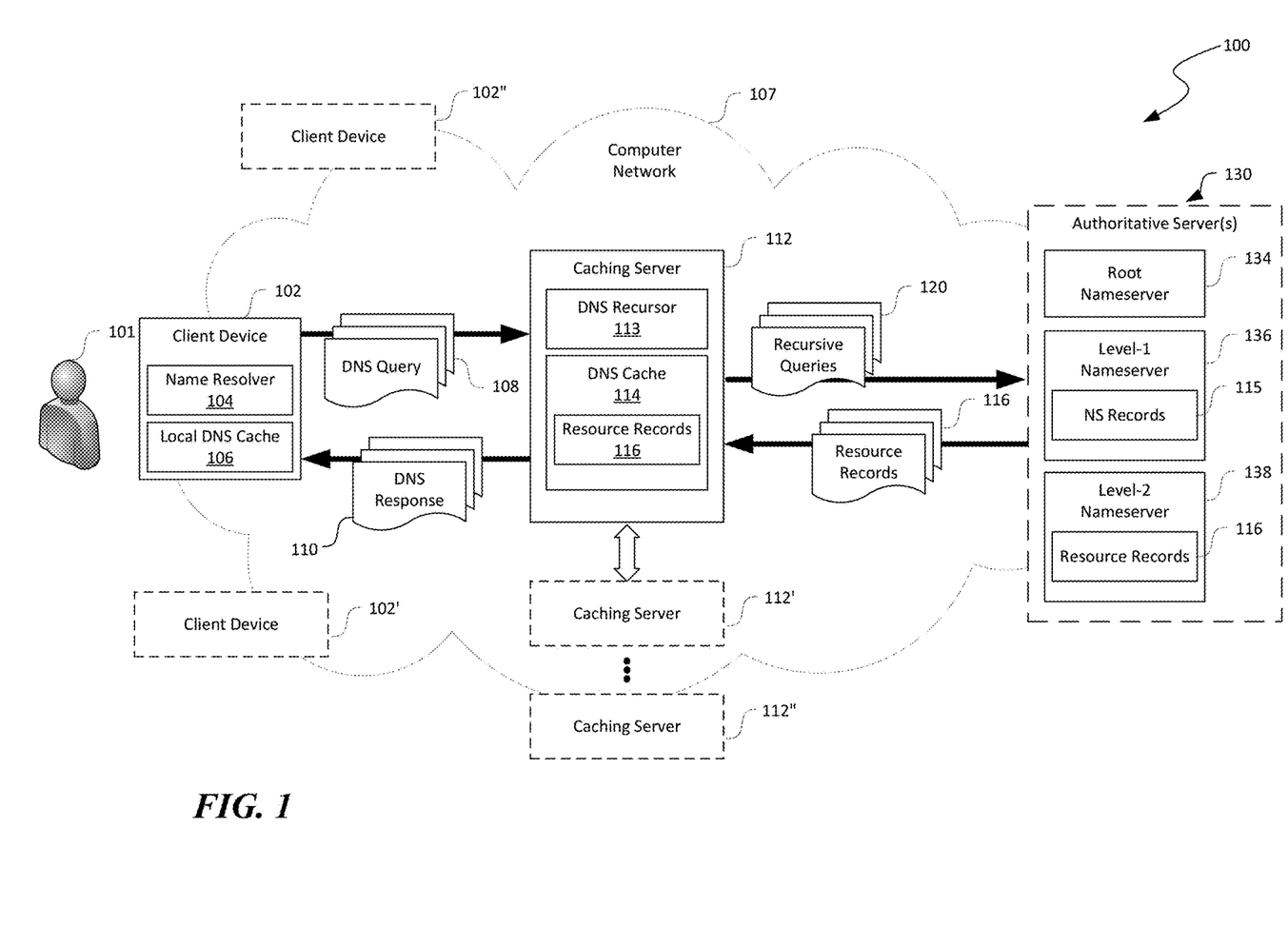
FIG. 1 is a schematic diagram illustrating computing frameworks having security management of name server records in accordance with embodiments of the disclosed technology.

FIG. 1 is a schematic diagram illustrating a DNS computing framework 100 having security management of NS records in accordance with embodiments of the disclosed technology. As shown in FIG. 1, the computing framework 100 can include a client device 102, a caching server 112, and one or more authoritative servers 130 interconnected by a computer network 107. The computer network 107 can include the Internet, a local area network, a metropolitan area network, a wide area network, and/or other suitable types of network.

The client device 102, the caching server 112, and the authoritative servers 130 can each include a processor and memory (not shown) containing instructions for execution by the processor to provide certain software components discussed in more detail below. Even though particular components of the computing framework 100 are shown in FIG. 1, in other embodiments, the computing framework 100 can also include additional and/or different components. For example, the computing framework 100 can include additional caching servers 112' and 112", additional client devices 102' and 102", and/or other suitable components.

The client device 102 can include a desktop, a laptop, a tablet, a smartphone, and/or other suitable types of computing device. For example, the client device 102 can be an iPhone or iPad provided by Apple, Inc. of Cupertino, Calif., an Android device, a Chromebook device, a Windows device, or any other suitable devices. In the illustrated embodiment of FIG. 1, the client device 102 can include a name resolver 104 and a local DNS cache 106. In other embodiments, the client device 102 may also include other suitable hardware and/or software components. The name resolver 104 can be configured to determine a network address (e.g., an IP address) associated with a domain name (e.g., "www.example.com"). The name resolver 104 may be a part of an operating system or an application executing on the client device 102.

The local DNS cache 106 can be configured to store resource records of previously resolved domain names. In one embodiment, the name resolver 104 can determine an IP address by accessing a resource record stored in the local DNS cache 106. In other embodiments, when a resource record does not exist in the local DNS cache 106, the name resolver 104 can query the caching server 112 for the desired resource record by, for example, transmitting a DNS query 108 to the caching server 112 and receiving a DNS response 110 from the caching server 112.

The authoritative servers 130 can include a plurality of DNS servers arranged in a hierarchy. For example, as shown in FIG. 1, the authoritative servers 130 can include a root nameserver 134, a level-1 nameserver 136 subordinate to the root nameserver 134, and a level-2 nameserver 138 subordinate to the level-1 nameserver 136. Even though a three-level hierarchy of DNS servers 130 is shown in FIG. 1, in other embodiments, the authoritative servers 130 can include one, two, four, or any other suitable number of levels and/or servers. For example, the authoritative servers 130 can also include a level-3 nameserver (not shown) subordinate to the level-2 nameserver 138.

As shown in FIG. 1, in the hierarchy of the authoritative servers 130, the root nameserver 134 can contain a resource record (not shown) containing a network address for the level-1 nameserver 136 corresponding to, e.g., a top-level domain such as ".com". The level-1 nameserver 136 can include a NS record 115 containing a URL for the level-2 nameserver 138 corresponding to a domain name, e.g., "example.com." The level-2 nameserver 138 can then include a resource record 116 containing an IP address (e.g., 192.168.0.1) that corresponds to a server associated with the domain name "www.example.com."

As shown in FIG. 1, the caching server 112 includes a DNS recursor 113 operatively coupled to a DNS cache 114. The DNS recursor 113 can be configured to recursively resolve a domain name of a target domain by transmitting recursive queries 120 to and receiving NS records 115 or resource records 116 from the one or more authoritative servers 130. The DNS cache 114 can be configured to store any resource records 116 previously resolved by the DNS recursor 113 for a period of time, for example, as specified by a time-to-live value. In certain embodiments, a value of the time-to-live period can be set by one or more of the authoritative servers 130. In other embodiments, the time-to-live value may be set by an administrator, an application, or other suitable entities.

The caching server 112 can be configured to return a copy of the cached resource records 116 as a DNS response 110 in response to a DNS query 108 from the client device 102. In one embodiment, the caching server 112 can determine if a resource record 116 corresponding to a domain name already exists in the DNS cache 114. If the resource record 116 already exists in the DNS cache 114, the caching server 112 transmits a copy of the resource record 116 as a DNS response 110 to the client device 102 via the computer network 107. If a resource record 116 does not exist in the DNS cache 114, the caching server 112 can invoke the DNS recursor 113 to retrieve a copy of the resource record 116 from the authoritative servers 130.

In operation, a user 101 can request access to a domain name (e.g., "www.example.com") using the client device 102. The name resolver 104 at the client device 102 can first determine if a resource record 116 for the requested domain name already exists or cached in the local DNS cache 106. If one already exists, the client device 102 can initiate network operations to servers associated with the domain name based on the cached resource record 116. If one does not exist, the client device 102 can consult the caching server 112 for a corresponding resource record 116.

In response to the received request, the caching server 112 can first determine if a resource record 116 is available in the DNS cache 114. If one is available, the caching server 112 can return the resource record 116 as a DNS response 110. If one is not available, the caching server 112 can invoke the DNS recursor 113 to recursively query the authoritative nameservers 130. For example, the caching server 112 can first query the root nameserver 134 for a resource record containing a network address of the level-1 nameserver 136 (e.g., 198.41.0.4). Then, the caching server 112 can query the level-1 nameserver 136 for a NS record 115 containing a network address of the level-2 nameserver 138. The caching server 112 can then query the level-2 nameserver 138 to retrieve a copy of the resource record 116 containing a network address of the requested domain name (e.g., 192.168.0.1) that corresponds to a server associated with the domain name "www.example.com."

During a domain name hijacking attack, an unauthorized party can fraudulently cause one or more of the NS records 115 be modified in order to redirect network traffic associated with a domain name. For example, an unauthorized party can cause the NS records 115 at the level-1 nameserver 136 to contain a network address of a new level-2 nameserver, which contains a resource record 116 that translates the domain name "www.example.com" into a new IP address (e.g., 124.16.0.1). As a result, any network traffic to the domain "www.example.com" can now be redirected from the original IP address of 192.168.0.1 to the new IP address of 124.16.0.1. Servers at the new IP address may be configured for phishing or other illicit activities.

Figure 2A:
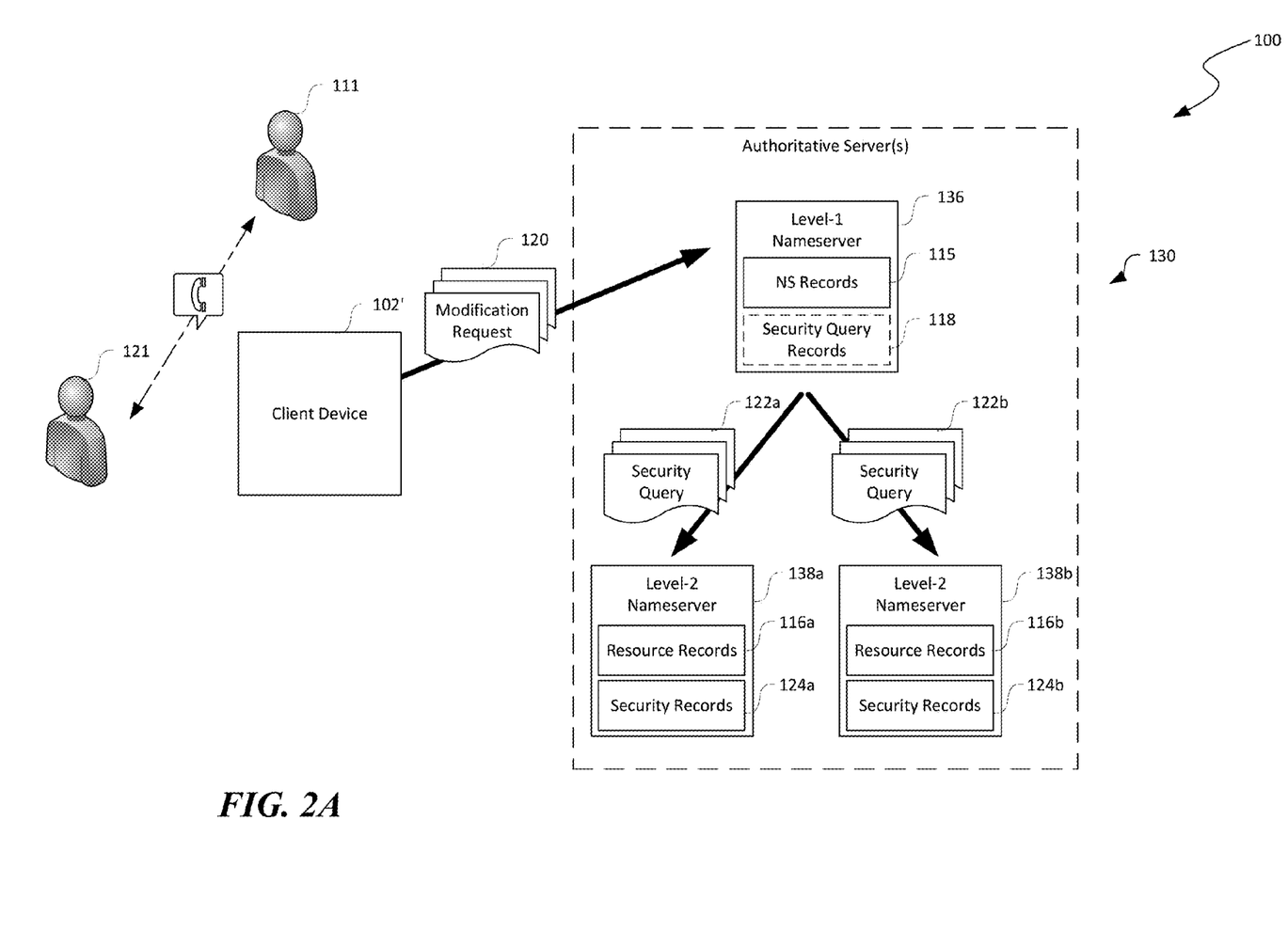
FIGS. 2A and 2B are schematic diagrams illustrating a portion of the computing framework during an operation to modify a name server record in accordance with embodiments of the disclosed technology.

Several embodiments of the disclosed technology can at least reduce, if not eliminate, the risk of such domain name hijacking attacks by requiring security records 124 (FIG. 2A) from both the original authoritative nameserver (e.g., first level-2 nameserver 138*a* in FIG. 2A) and the new authoritative nameserver (e.g., second level-2 nameserver 138*b* in FIG. 2A). If the security records do not at least substantially match, the requested modification of NS records 115 can be denied, as described in more detail below with reference to FIGS. 2A and 2B.

Figure 2B:
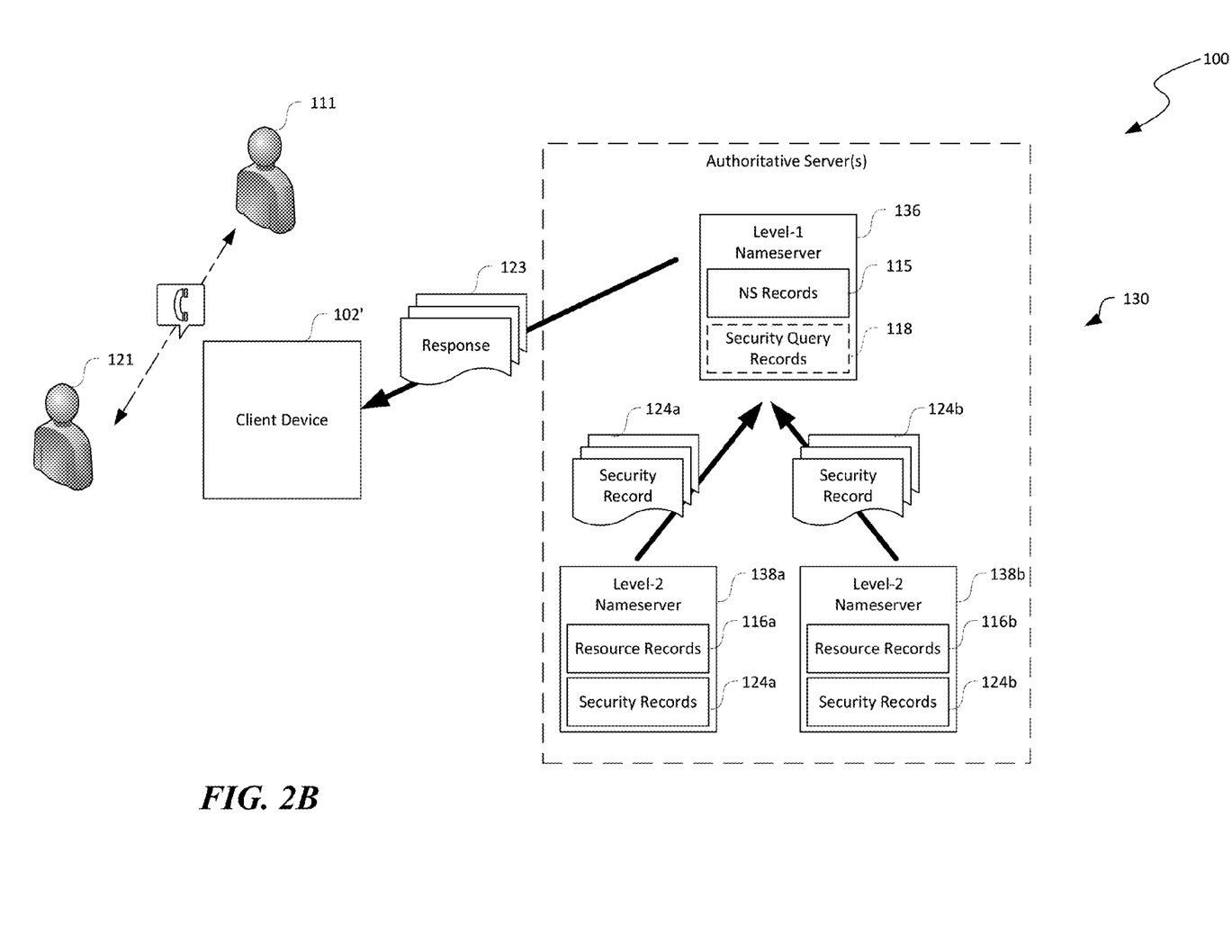

FIGS. 2A and 2B are schematic diagrams illustrating a portion of the computing framework 100 during an operation to modify an NS record 115 at the level-1 nameserver 136 from containing a first level-2 nameserver 138*a* to a second level-2 nameserver 138*b* in accordance with embodiments of the disclosed technology. Certain components of the computing framework 100 of FIG. 1 are omitted in FIGS. 2A and 2B for clarity. The first and second level-2 nameservers 138*a* and 138*b* can be collectively referred to below as level-2 nameservers 138.

As shown in FIG. 2A, the level-1 nameserver 136 can optionally include one or more security query records 118 associated with corresponding NS records 115. In certain embodiments, the security query records 118 can each contain an IP address or a URL of a server from which a security record 124 can be retrieved. For example, in the illustrated embodiment, the security query records 118 can contain an IP address (e.g., 204.74.112.1) of the first level-2 nameserver 138a. In other examples, the security query records 118 can contain IP addresses of suitable servers other than the first level-2 nameserver 138a. In further examples, the security query records 118 may be omitted, and the level-1 nameserver 136 can determine an IP address for retrieving security records 124 by resolving the first or second level-2 nameserver 138a or 138b using the recursive resolution process described above with reference to FIG. 1.

Also shown in FIG. 2A, the first and second level-2 nameserver 138 can each contain one or more first and second security records 124a and 124b (referred to collectively as "security records 124" hereinafter), respectively. The security records 124 can be individually associated with a domain name (e.g., "www.example.com"). In certain embodiments, the security records 124 can be configured by an administrator (e.g., a domain owner). In other embodiments, the security records 124 can be configured by an application executing on the level-2 nameservers 138. As described above, the security records 124 can be static or can vary continuously or periodically. For example, though not shown in FIG. 2A, the first level-2 nameserver 138a can include a random number generator configured to generate a random number as a value for the first security records 124a on a continuous or periodic basis. As described in more detail below, the level-1 nameserver 136 can utilize the optional security query records 118 and the security records 124 at the level-2 nameservers 138 to improve security of the NS records 115 at the level-1 nameserver 136.

As shown in FIG. 2A, a requestor 111 (e.g., a domain owner or potential hijacker) can contact a representative 121 of a network registrar via telephone to request modification of one or more NS records 115 associated with a domain name (e.g., "www.example.com"). For example, the requestor 111 can request that the NS record 115 be modified from containing the first level-2 nameserver 138a (e.g., "ns1.example.com") to the second level-2 nameserver 138b (e.g., "ns2.example.com").

The representative 121 can ask the requestor 111 for passwords, answers to secrete questions, or other suitable credentials. In response to obtaining the suitable credentials, the representative 121, utilizing a client device 102' (e.g., a desktop computer), can transmit a modification request 120 to the level-1 nameserver 136 for modifying one or more of NS records 115 associated with "www.example.com". In response to receiving the modification request 120, the level-1 nameserver 136 can generate first and second security queries 122a and 122b for retrieving first and second security records 124a and 124b at the first and second level-2 nameservers 138a and 138b, respectively. One example data structure suitable for the security queries 122a and 122b is described in more detail below with reference to FIGS. 4A and 4B.

In certain embodiments, the level-1 nameserver 136 can transmit the first and second security queries 122a and 122b based on, for example, IP addresses, URLs, or other suitable network addresses contained in the optional security query records 118. For instance, the level-1 nameserver 136 can contain first and second security query records 118 containing first and second IP addresses of the first and second level-2 nameservers 138a and 138b, respectively. In other embodiments, the level-1 nameserver 136 can determine an IP address for the first or second nameserver 138a or 138b via recursive resolution. In further embodiments, the level-1 nameserver 136 can deny the modification request 120 in response to determining that the first or second level-2 nameserver 138a or 138b does not have a corresponding security query record 118.

As shown in FIG. 2B, upon receiving the security queries 122a and 122b, the first and second level-2 nameservers 138a and 138b can individually transmit a current copy of the first and second security records 124a and 124b, respectively, to the level-1 nameserver 136. The level-1 nameserver 136 then receives the first and second security records 124a and 124b from the first and second nameservers 138a and 138b, respectively. The level-1 nameserver 136 can be configured to determine whether to allow the requested modification of the NS records 115 based on the received first and second security records 124a and 124b.

In certain embodiments, the level-1 nameserver 124a can determine if the first and second security records 124a and 124b at least substantially match via a bit-wise, character-wise, or other suitable types of comparison. For example, in one embodiment, the level-1 nameserver 136 can indicate a substantial match between the first and second security records 124a and 124b if a bit-wise or character-wise similarity percentage thereof exceeds 90%, 95%, 99%, or other suitable thresholds. In response to determining that the first and second security records 124a and 124b at least substantially match each other, the level-1 nameserver 136 can allow the requested modification of the NS records 115. If the first and second security records 124a and 124b do not substantially match each other, the level-1 nameserver 136 can reject the request to modify the NS records 115. As shown in FIG. 2B, the level-1 nameserver 136 can also be configured to generate a response 123 to the received request indicating, for example, a confirmation of modification of the NS records 115 or a denial of the requested modification. Optionally, the level-1 nameserver 136 can also be configured to raise an alarm upon rejecting a modification request 120.

Several embodiments of the computing framework 100 described above with reference to FIGS. 1-2B can at least reduce, if not eliminate, the risk of unauthorized modification of NS records 115 associated with a domain name, and thus improving security of a DNS system. For example, as described above, the level-1 nameserver 136 can allow modification of NS records 115 only when the security records 124a and 124b received from the first and second level-2 nameservers 138a and 138b, respectively, at least substantially match each other. If the requestor 111 is a hijacker who attempts to fraudulently modify the NS records 115, the hijacker's DNS server (e.g., the second level-2 nameserver 136b) is unlikely to contain the same or substantially similar security records 124 as those on the first level-2 nameserver 138a because the hijacker is not in control of the first level-2 nameserver 138a.

In certain embodiments, security of the NS records 115 can be further improved by, for example, continuously or periodically varying content or value of the first security records 124a on the first nameserver 136a. For example, the first level-2 nameserver 138a can be configured to continuously vary the content or value of the first security records 124a using, for instance, a random number or text generator. As such, the first and second security records 124a and 124b can substantially match each other only when the first and second level-2 nameservers 138a and 138b are under the control of a single entity (e.g., the domain owner or administrator) to have synchronized first and second security records 124a and 124b.

In other embodiments, security of the NS records 115 can be further improved by, for example, allowing configuration of the first security records 124a or the second security records 124b during a period when the domain owner or administrator desires a change of the NS records 115. Thus, during times other than this period, the first level-2 nameserver 138a does not contain any first security records 124a or the first security records 124a would contain a null value. As a result, the first and second security records 124a and 124b would never match during such times. Thus, the level-1 nameserver 136 would then deny any request to modify the NS records 115 based on a null value from the first level-2 nameserver 138a or a divergence between the first and second security records 124a and 124b.

In further embodiments, the optional security query records 118 can include a set of security query records 118 each containing, for example, an IP address from which the first or second security records 124a and 124b may be retrieved. The level-1 nameserver 136 can be configured to randomly, sequentially, or in other suitable orders select one of security query record 118 with a corresponding IP address and transmit the first and second security queries 122a and 122b to the corresponding IP addresses. Thus, without having control over the level-1 nameserver 136, a hijacker would not be able to produce second security records 124b that match the first security records 124a on the first level-2 nameserver 138a. In yet further embodiments, the foregoing techniques of improving security of the NS records 115 can be combined or sub-combined in any suitable manners.

Even though the security management technique is described herein using the level-1 nameserver 136 as an example DNS server containing NS records 115, in other embodiments, similar techniques can also be applied to the root nameserver 134 (FIG. 1), the level-2 nameserver 138, or other higher- or lower-level nameservers (not shown). For example, the root nameserver 134 can also contain optional security query records 118 containing, for example, an IP address of the level-1 nameserver 136. The level-1 nameserver 136 can also contain security records 124. Upon receiving a request to modify an NS record 115 associated with the level-1 nameserver 136, the root nameserver 134 can determine whether to allow the modification based on the queried security records 124, as described above.

Figure 3:
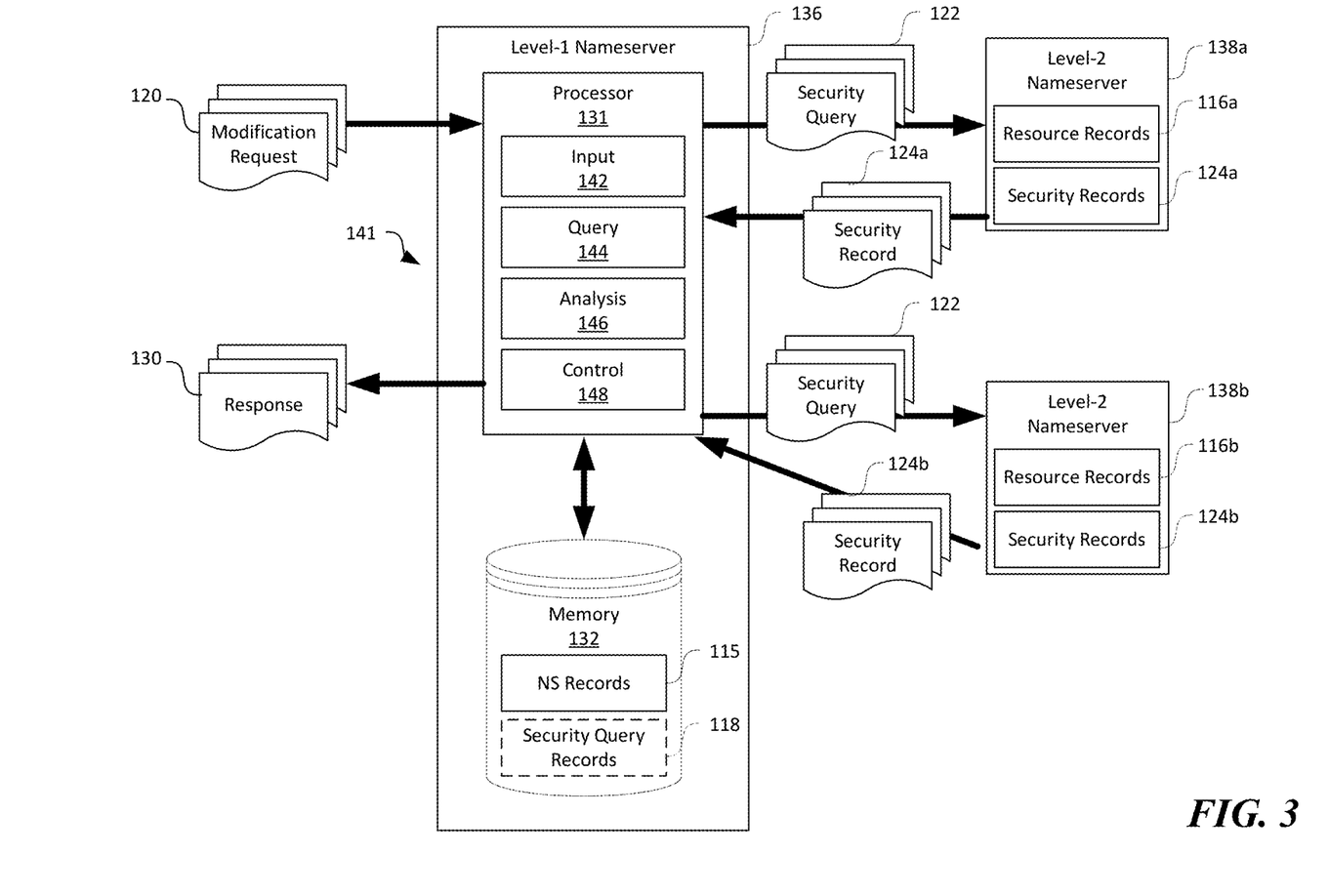
FIG. 3 is a block diagram showing software components suitable for the level-1 name server of FIG. 1 and in accordance with embodiments of the disclosed technology.

FIG. 3 is a block diagram showing software components 141 suitable for the level-1 nameserver 136 of FIGS. 1-2B and in accordance with embodiments of the disclosed technology. In FIG. 3 and in other Figures hereinafter, individual software components, objects, classes, modules, and routines may be a computer program, procedure, or process written as source code in C, C++, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). Components within a system may take different forms within the system. As one example, a system comprising a first component, a second component and a third component can, without limitation, encompass a system that has the first component being a property in source code, the second component being a binary compiled library, and the third component being a thread created at runtime.

The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry. A person of ordinary skill in the art would recognize that hardware can be considered fossilized software, and software can be considered liquefied hardware. As just one example, software instructions in a component can be burned to a Programmable Logic Array circuit, or can be designed as a hardware circuit with appropriate integrated circuits. Equally, hardware can be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 3, the level-1 nameserver 136 can include a processor 131 coupled to a memory 132. The processor 131 can include a microprocessor, a field-programmable gate array, and/or other suitable logic devices. The memory 132 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 131 (e.g., instructions for performing the methods discussed below with reference to FIGS. 5-7). As shown in FIG. 3, the memory 132 can also contain data representing a set of NS records 115, optional security query records 118, and/or other suitable data.

The processor 131 can execute instructions to provide a plurality of software components 141 configured to improve security of the NS records 115. As shown in FIG. 3, the software components 141 include an input component 142, a query component 144, an analysis component 146, and a control component 148 operatively coupled to one another. In one embodiment, all of the software components 141 can reside on a single computing device (e.g., a DNS server). In other embodiments, the software components 141 can also reside on a plurality of distinct computing devices. In further embodiments, the software components 141 may also include network interface components and/or other suitable modules or components (not shown).

The input component 142 can be configured to receive a modification request 120, from, for example, the client device 102' of FIG. 2A. The modification request 120 can include a request to modify one or more of the NS records 115 from, for example, containing the first level-2 nameserver 138a to the second level-2 nameserver 138b. The input component 142 can include a network interface module or other suitable types of communications modules.

The query component 144 can be configured to construct a security query 122 in response to the received modification request 120. The security query 122 can contain various suitable questions, inquiries, or parameters used to query one or more first and second security records 124a and 124b from the first and second level-2 nameservers 138a and 138b, respectively. One data structure suitable for the security query 122 is described in more detail below with reference to FIGS. 4A and 4B.

The query component 144 can also be configured to transmit the constructed security query 122 individually to the first and second level-2 nameservers 138a and 138b. In certain embodiments, the query component 144 can transmit the security queries 122 based on IP addresses, URLs, or other suitable network identifications contained in the optional security query records 118. In other embodiments, the query component 144 can be configured to select one of the security query records 118 randomly, sequentially, or in other suitable manners and transmitting the security queries 122 based on an IP address, URL, or other suitable network identification contained in the selected security query records 118. In further embodiments, the query component 144 can also be configured to determine an IP address of the first or second level-2 nameservers 138a or 138b via recursive resolution.

In response to receiving the security queries 122, the first and second level-2 nameservers 138a and 138b can be configured to individually transmit a current copy of the first and second security records 124a and 124b to the level-1 nameserver 136. The input component 142 can be configured to receive the first and second security records 124a and 124b and transmit the receive copies to the analysis component 146 for determining whether to allow the modification request 120 based thereon.

In certain embodiments, the analysis component 146 can include one or more parsers, comparators, counters, or other suitable modules configured to perform a bit-wise, character-wise, or other types of comparison between the received first and second security records 124a and 124b. For example, in one embodiment, the analysis component 146 can include a parser and a character comparator. The parser can be configured to parse a text string contained in each of the first and second security records 124a and 124b. The character comparator can be configured to compare the parsed text strings again each other.

The analysis component 146 can then include one or more of modules configured to generate a comparison characteristic or profile of the first and second security records 124a and 124b. Such example modules can include:
  A counter configured to count a number of matches or mismatches between the parsed text strings;
  A percentage calculator configured to compute a percentage of matched characters or mismatched characters; or
  A Boolean operator configured to output TRUE OR FALSE regarding whether the text strings completely match each other.

The analysis component 146 can also be configured to indicate that the modification request for modifying the NS records 115 can be allowed based on one or more of the following example conditions:
  A number of matches between the parsed text strings exceeds a threshold;
  A number of mismatches between the parsed text strings is below a threshold;
  A percentage of matched characters exceeds a threshold percentage;
  A percentage of mismatched characters is below a threshold percentage; or
  A Boolean output of TRUE is present regarding whether the text strings completely match each other.

The foregoing comparison modules, techniques, and example conditions are for illustration purposes only. In other embodiments, hashing, encrypting, decrypting, or other suitable comparison techniques and associated modules or routines can also be used in addition to or in lieu of the techniques described above.

The control component 148 can be configured to modify the NS records 115 based on an indication from the analysis component 146 that the modification request 120 is allowed. Without indication from the analysis component 146, the control component 148 can maintain current copies of the NS records 115 in the memory 132. The control component 148 can also be configured to generate a response 123 to the modification request 120 indicating that the NS records 115 are modified, or the modification request 120 is rejected, denied, or refused.

Figure 4A:
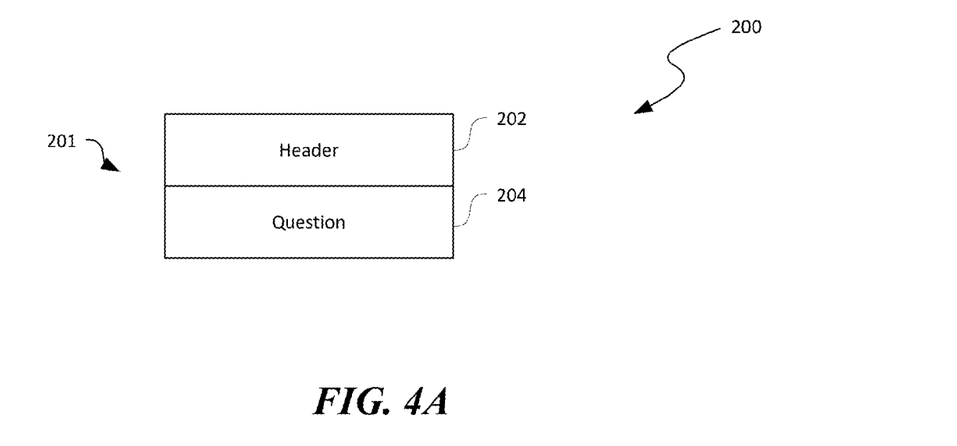
FIG. 4A is a schematic diagram illustration an example data structure suitable for the security query of FIG. 2A in accordance with embodiments of the disclosed technology.

FIG. 4A is a schematic diagram illustration an example data structure 200 suitable for the security query 122 of FIG. 2A in accordance with embodiments of the disclosed technology. As shown in FIG. 4A, the data structure 200 can include a header field 202 and a question field 204. The header field 202 can include parameters that describe the type of query and which fields are contained in the query. For example, the header field 202 can contain a query identifier, a one-bit field that specifies whether the data structure 200 is a query or a response, or other suitable parameters.

Figure 4B:
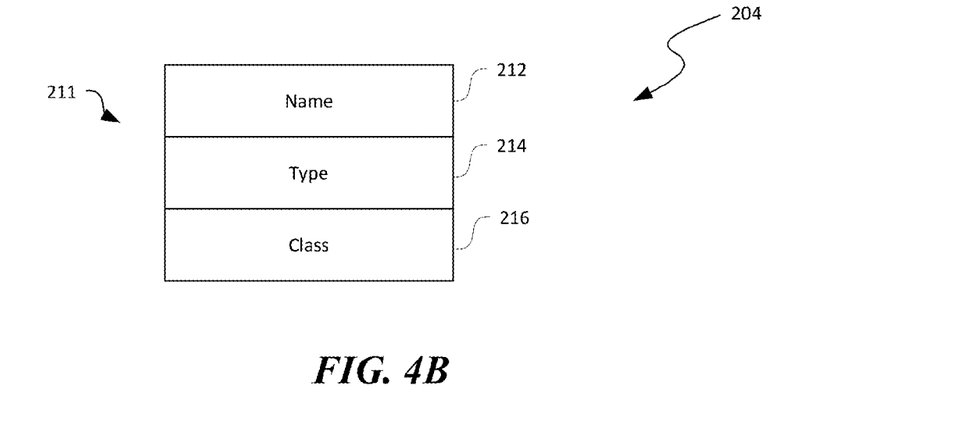
FIG. 4B is a schematic diagram illustration an example data structure suitable for the question field of FIG. 4A in accordance with embodiments of the disclosed technology.

The question field 204 can contain a question for a DNS server (e.g., the level-1 nameserver 136 of FIG. 2A). FIG. 4B is a schematic diagram illustration an example data structure suitable for the question field 204 of FIG. 4A in accordance with embodiments of the disclosed technology. As shown in FIG. 4B, the question field 204 can include a name field 212, a type field 214, and a class field 216. The name field 212 can contain a domain name (e.g., "www.example.com") represented as a sequence of labels (e.g., "example" and "com"). The type field 214 can contain data specifying a query type, for example, data indicating a security query. The class field 216 can contain data specifying the class of the query (e.g., "IN" indicating Internet). In other embodiments, the question field 204 can also include other suitable fields.

Figure 4C:
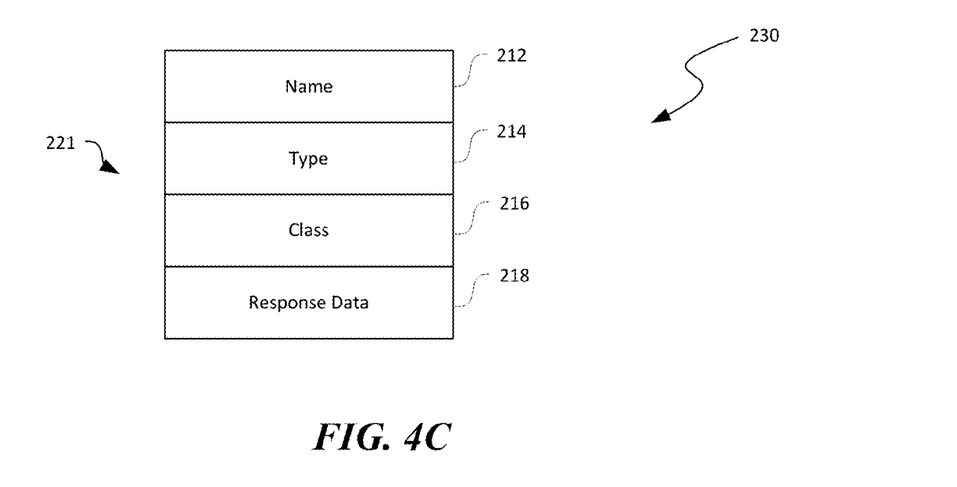
FIG. 4C is a schematic diagram illustration an example data structure suitable for the security record of FIG. 2B in accordance with embodiments of the disclosed technology.

FIG. 4C is a schematic diagram illustration an example data structure 230 suitable for the first or second security record 124a or 124b of FIG. 2B in accordance with embodiments of the disclosed technology. As shown in FIG. 4C, the data structure 230 can include certain fields generally similar to that of FIG. 4B. For example, the data structure 230 can include a name field 212, a type field 214, and a class field 216. The data structure 230 can also include a response data field 218 containing, for example, the security data of the first or second security record 124a or 124b. In other embodiments, the data structure 230 can also include a time-to-live field, a length of response data field, or other suitable fields.

Figure 5:
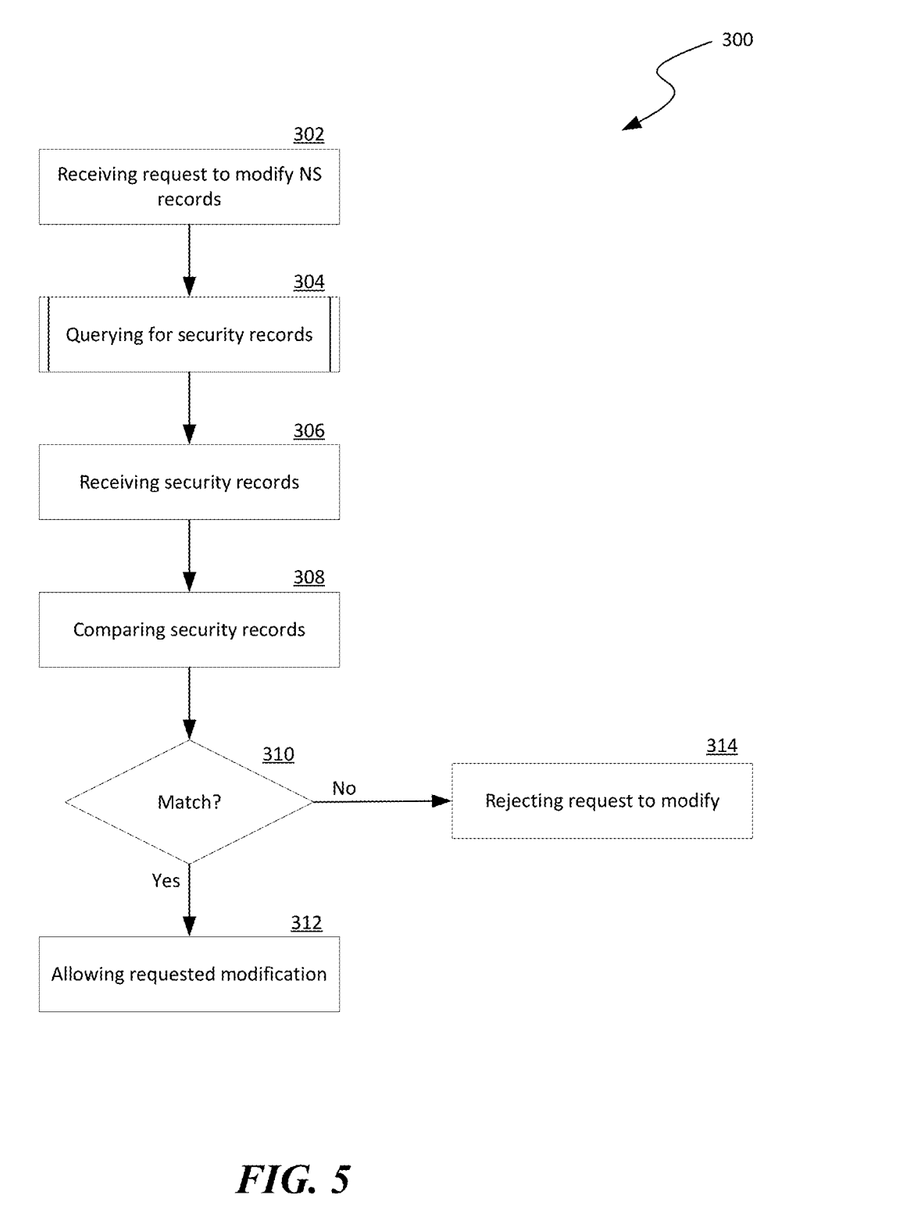
FIG. 5 is a flow diagram illustrating embodiments of a process of managing security of name server records in accordance with embodiments of the disclosed technology.

FIG. 5 is a flow diagram illustrating embodiments of a process 300 of managing security of NS records in accordance with embodiments of the disclosed technology. Even though various embodiments of the process 300 are described below with reference to the computing framework 100 of FIG. 1 and the software modules 141 of FIG. 3, in other embodiments, the process 300 may be performed with other suitable types of computing frameworks, systems, components, or modules.

As shown in FIG. 5, the process 300 can include receiving, for example, at the level-1 nameserver 136 of FIG. 2A, a request to modify one or more NS record at stage 302. The requested modification changes the NS record from containing an original DNS server (e.g., the first level-2 nameserver 138a of FIG. 2A) as an authoritative server for a particular domain name (e.g., "www.example.com") to a new DNS server (e.g., the second level-2 nameserver 138b of FIG. 2A).

The process 300 can then include individually querying, for example utilizing the query component 144 of FIG. 3, the original and new DNS servers (e.g., the first and second level-2 nameservers 138a and 138b) for security records contained thereon at stage 304. An embodiment of querying a DNS server for a security record is described in more detail below with reference to FIG. 6. The process 300 can then include receiving, for example, utilizing the input component 142 of FIG. 3, the queried security records from the original and new DNS servers at stage 308.

The process 300 can then include comparing, for example, utilizing the analysis component of FIG. 3, the received security records from the original and new DNS servers at stage 308. The process 300 can then include a decision stage 310 to determine if the received security records at least substantially match each other. Various comparison techniques and associated example conditions for substantially matching the security records are described above with reference to FIG. 3. In response to determining that the security records at least substantially match each other, the process 300 includes allowing the requested modification of NS records utilizing, for example, the control component 148 of FIG. 3. In response to determining that the security records do not substantially match each other, the process 300 includes rejecting the request to modify the NS records at stage 314.

Figure 6:
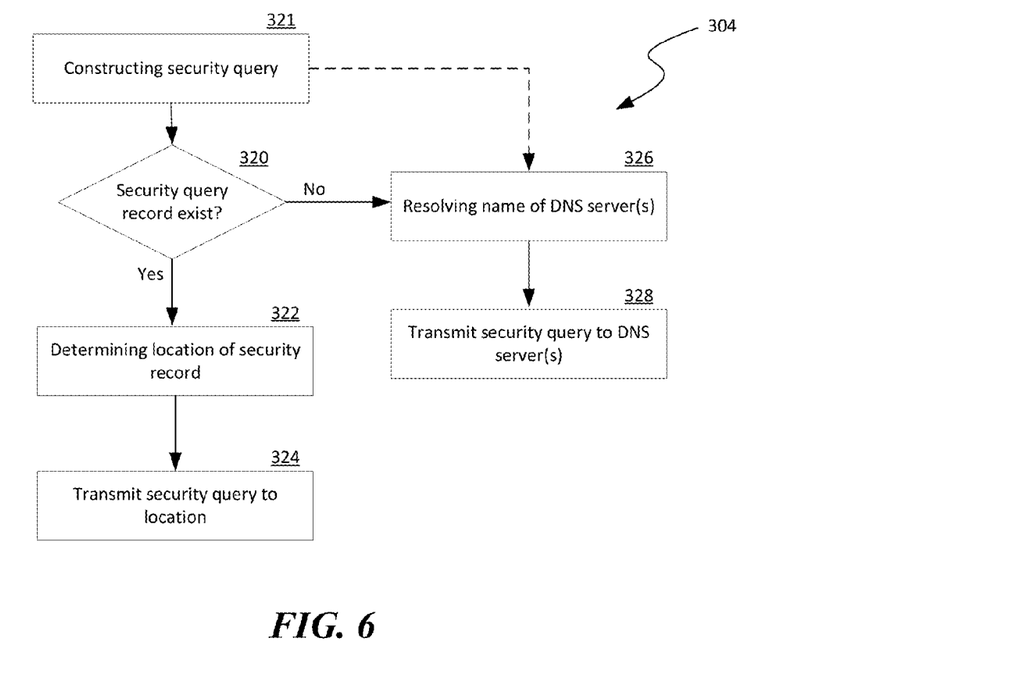
FIG. 6 is a flow diagram illustrating embodiments of a process of querying for security records in accordance with embodiments of the disclosed technology.

FIG. 6 is a flow diagram illustrating embodiments of a process 304 of querying for security records in accordance with embodiments of the disclosed technology. As shown in FIG. 6, the process 304 can include constructing a security query at stage 321. The security query can be a DNS query configured to retrieve one or more security records from a DNS server. The process 304 can then include a decision stage 320 to determine if a security query record exists. The security query record is associated with one or more NS records requested to be modified.

In response to determining that a security query record exists, the process 304 proceeds to determining a network location associated with the security records at stage 322. As described above, in certain embodiments, the security query record can contain an IP address at which the security records are located. In other embodiments, the security query record may also contain URLs, MAC addresses, or other suitable network identifications at which the security records are located. The process 304 can then include transmitting the constructed security queries to the network locations associated with the security records at stage 324.

In response to determining that a security query record does not exist, the process 304 proceeds to resolving a name of the DNS server (e.g., the second level-2 nameserver 328b in FIG. 2A) at stage 326. The process 304 can then include transmitting the constructed security queries to the determined network location associated with the DNS server at stage 328. In further embodiments, the decision stage 320 and operation stages 322 and 324 may be omitted. The process 304 can proceed to resolving a name or the DNS server at stage 326 from constructing the security query at stage 321.

Figure 7:
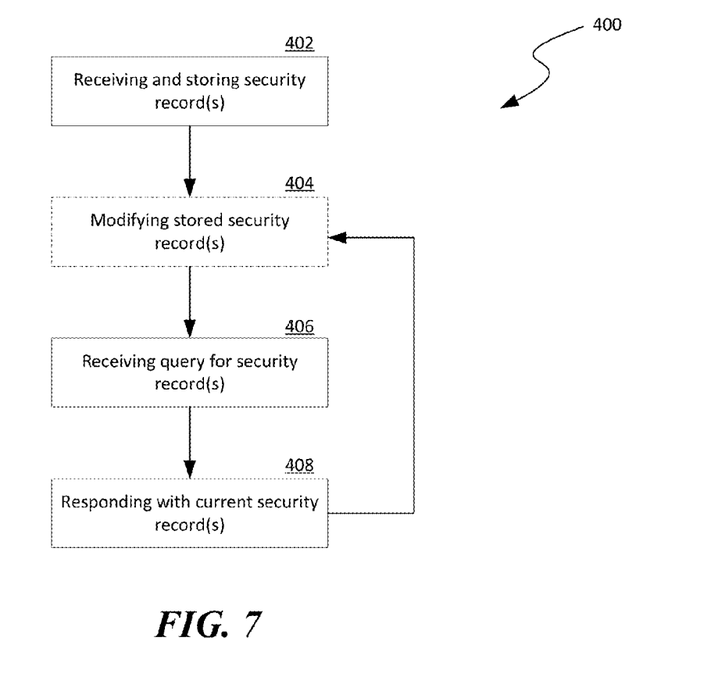
FIG. 7 is a flow diagram illustrating embodiments of a process of managing stored security records in accordance with embodiments of the disclosed technology.

FIG. 7 is a flow diagram illustrating embodiments of a process 400 of managing stored security records in accordance with embodiments of the disclosed technology. Embodiments of the process 400 can be performed by, for example, the first or second level-2 nameserver 138a or 138b of FIG. 2A or another suitable DNS server. As shown in FIG. 7, the process 400 can include receiving and storing one or more security records associated with a domain name at stage 402. In certain embodiments, the security records can be received and stored only during a select period. In other embodiments, the security records can persist on a DNS server.

The process 400 can then optionally include modifying the stored security records at stage 404. The stored security records can be modified continuously, periodically, or in other suitable manners. The process 400 can also include receiving a security query from, for example, the level-1 nameserver 136 of FIG. 2A at stage 406. In response to the received security query, the process 400 can include responding with a current copy of the stored security records at stage 408. The process 400 can then revert to optionally modifying the stored security records at stage 404.

Figure 8:
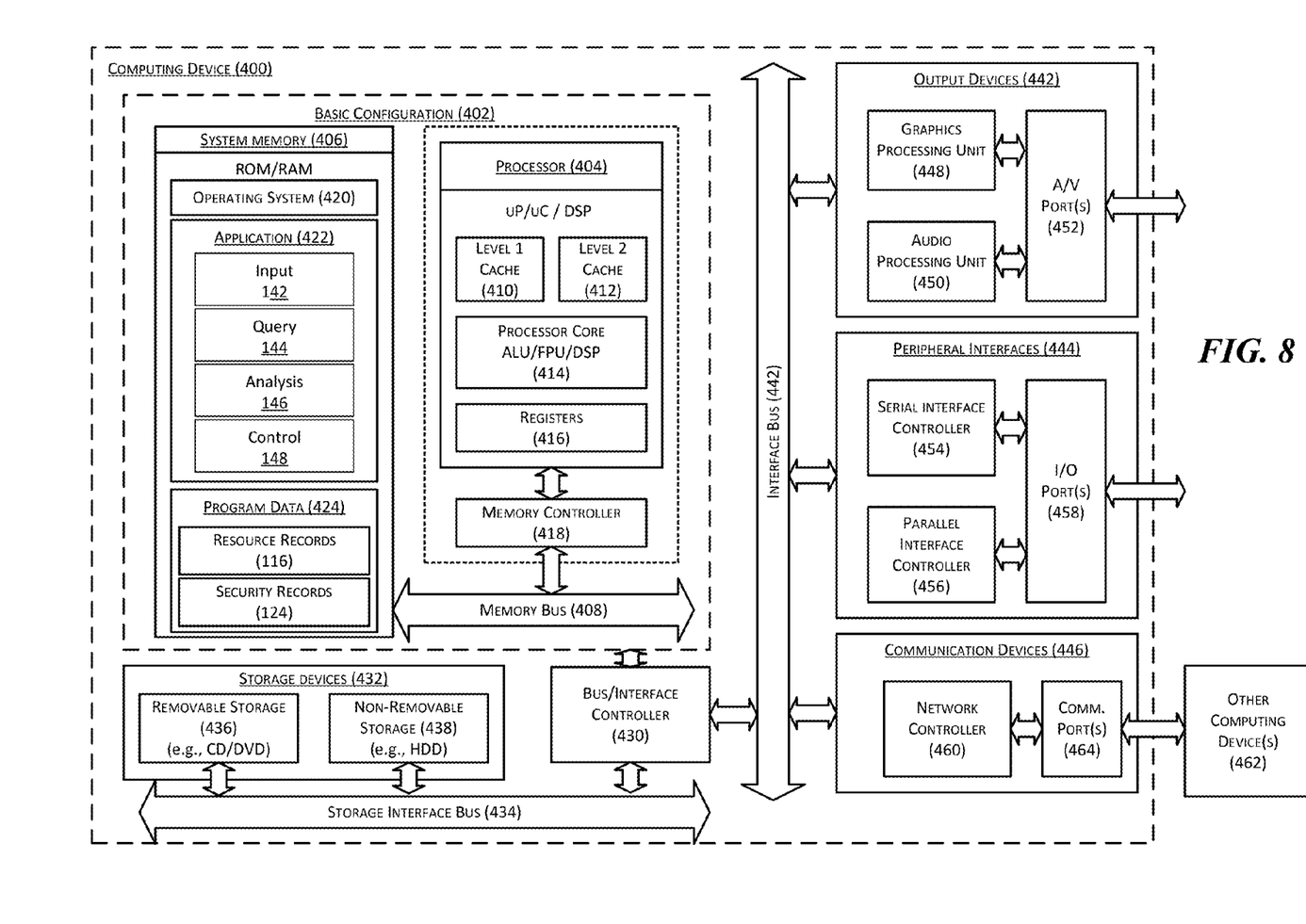
FIG. 8 is a computing device suitable for certain components of the computing frameworks in FIGS. 1-2B.

FIG. 8 is a computing device 400 suitable for certain components of the computing framework 100 in FIGS. 1-2B. For example, the computing device 400 may be suitable for the level-1 nameserver 136, level-2 nameserver 138, the client device 102, and the caching server 112 of FIG. 1. In a very basic configuration 402, computing device 400 typically includes one or more processors 404 and a system memory 406. A memory bus 408 may be used for communicating between processor 404 and system memory 406.

Depending on the desired configuration, the processor 404 may be of any type including but not limited to a microprocessor (µP), a microcontroller (µC), a digital signal processor (DSP), or any combination thereof. The processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, the system memory 406 may be of any type including but not limited to volatile memory (such as RAM), non-volatile memory (such as ROM, flash memory, etc.) or any combination thereof. The system memory 406 can include an operating system 420, one or more application 422, and program data 424. As shown in FIG. 8, in certain embodiments, the application 422 may include, for example, the input component 142, the query component 144, the analysis component 146, and the control component 148, as described in more detail above with reference to FIG. 3. In other embodiments, the application 422 can also include other suitable components. The program data 424 may include, for example, the resource records 116 and the security records 124. This described basic configuration 402 is illustrated in FIG. 9 by those components within the inner dashed line.

The computing device 400 may have additional features or functionality, and additional interfaces to facilitate communications between basic configuration 402 and any other devices and interfaces. For example, a bus/interface controller 430 may be used to facilitate communications between the basic configuration 402 and one or more data storage devices 432 via a storage interface bus 434. The data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, removable storage devices 436, and non-removable storage devices 438 are examples of computer readable storage media. Computer readable storage media include storage hardware or device(s), examples of which include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which may be used to store the desired information and which may be accessed by computing device 400. Any such computer readable storage media may be a part of computing device 400. The term "computer readable storage medium" excludes propagated signals and communication media.

The computing device 400 may also include an interface bus 440 for facilitating communication from various interface devices (e.g., output devices 442, peripheral interfaces 444, and communication devices 446) to the basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 400 may also be implemented as a personal computer including both laptop computer and non-laptop computer configurations.

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

I claim:

1. A computing device, comprising:
a processor; and
a memory containing instructions executable by the processor to cause the computing device to:
   receive a request to modify a domain name record, the domain name record containing a first domain name server as an authoritative domain name server of a domain, wherein the request seeks to replace the first domain name server with a second domain name server in the domain name record as the authoritative domain name server of the domain;
   in response to receiving the request to modify the domain name record, individually query the first and second domain name servers for corresponding first and second security records contained on the first and second domain name servers, respectively, the first and second security records individually containing security data configured by an owner of the domain;
   receive at least one of the first or second security record from the first or second domain name server, respectively; and
   upon receiving the at least one of the first or second security record, determine whether to allow the requested modification to the domain name record based on a comparison of the first and second security records.

2. The computing device of claim 1 wherein:
the computing device is a domain name server associated with a domain name space; and
the domain name record is associated with a subdomain of the domain name space.

3. The computing device of claim 1 wherein:
the computing device contains a first security query record associated with the first domain name server and a second security query record associated with the second domain name server;
the memory contains additional instructions executable by the processor to cause the computing device to:
   construct first and second security queries based on the first and second security query records, the first and second security query records individually containing a network location at which the first or second security record is stored; and
   transmit the constructed first and second security queries to the first and second domain name servers, respectively.

4. The computing device of claim 1 wherein:
the computing device contains a first set of security query records associated with the first domain name server and a second set of security query records associated with the second domain name server;
the memory contains additional instructions executable by the processor to cause the computing device to:
   randomly select a first security query record from the first set of security query records;
   randomly select a second security query record from the second set of security query records;
   construct first and second security queries based on the selected first and second security query records, the first and second security query records individually containing a network location at which the first or second security record is stored; and transmit the constructed first and second security queries to the first and second domain name servers, respectively.

5. The computing device of claim 1 wherein the first and second security records individually contain a text string, a value of which is periodically or continually modified.

6. The computing device of claim 1 wherein:
the first and second security records include first and second text strings, respectively; and
the memory contains additional instructions executable by the processor to cause the computing device to:
determine whether the first text string matches the second text string; and
in response to determining that the first text string matches the second text string, indicate that the requested modification of the domain name record is allowed.

7. The computing device of claim 1 wherein:
the first and second security records include first and second text strings, respectively; and
the memory contains additional instructions executable by the processor to cause the computing device to:
determine whether the first text string matches the second text string; and
in response to determining that the first text string does not at least substantially match the second text string, indicate that the requested modification of the domain name record is not allowed.

8. A method for protecting domain name security, comprising:
receiving a request to modify a domain name record containing a first domain name server to containing a second domain name server;
in response to the received request, individually querying the first and second domain name servers for corresponding first and second security records;
receiving the first and second security records from the first and second domain name servers, respectively; and
determining whether to allow the domain name record to be modified based on a comparison of the first and second security records.

9. The method of claim 8 wherein:
receiving the request to modify includes receiving the request to modify at a domain name server associated with a domain name space; and
the domain name record is contained at the domain name server associated with a domain name space; and
the domain name record is associated with a subdomain of the domain name space.

10. The method of claim 8 wherein:
receiving the request to modify includes receiving the request to modify at a domain name server containing a first security query record associated with the first domain name server and a second security query record associated with the second domain name server;
individually querying the first and second domain name servers includes:
constructing first and second security queries based on the first and second security query records stored at the domain name server, the first and second security query records individually containing a network location at which the first or second security record is stored; and
transmitting the constructed first and second security queries to the first and second domain name servers, respectively.

11. The method of claim 8 wherein:
receiving the request to modify includes receiving the request to modify at a domain name server containing a first set of security query records associated with the first domain name server and a second set of security query records associated with the second domain name server;
individually querying the first and second domain name servers includes:
randomly selecting a first security query record from the first set of security query records;
randomly selecting a second security query record from the second set of security query records;
constructing first and second security queries based on the selected first and second security query records, the first and second security query records individually containing a network location at which the first or second security record is stored; and
transmitting the constructed first and second security queries to the first and second domain name servers, respectively.

12. The method of claim 8 wherein receiving the first and second security records includes receiving first and second security records individually containing a text string, a value of which is periodically or continually modified.

13. The method of claim 8 wherein:
the first and second security records include first and second text strings, respectively; and
determining whether to allow the domain name record to be modified includes:
determining whether the first text string matches the second text string; and
in response to determining that the first text string matches the second text string, allowing the domain name record to be modified in response to the received request.

14. The method of claim 8 wherein:
the first and second security records include first and second text strings, respectively; and
determining whether to allow the domain name record to be modified includes:
determining whether the first text string matches the second text string; and
in response to determining that the first text string does not match the second text string, rejecting the request to modify the domain name record.

15. A method for protecting domain name security, comprising:
receiving a request to replace a first domain name server with a second domain name server as an authoritative server associated with a domain name; and
in response to the received request,
transmitting first and second security queries to the first and second domain name servers, respectively;
receiving first and second security records in response to the first and second security queries from the first and second domain name servers, respectively; and
maintaining the first domain name server as the authoritative server associated with the domain name unless the first and second security records at least substantially match each other.

16. The method of claim 15, further comprising:
performing a bit-wise or character-wise comparison of the first and second security records; and
determining whether the first and second security records at least substantially match each other based on the bit-wise or character-wise comparison.

17. The method of claim 15, further comprising:
performing a bit-wise or character-wise comparison of the first and second security records;
determining whether the first and second security records at least substantially match each other based on the bit-wise or character-wise comparison; and
in response to determining that the first and second security records at least substantially match each other, allowing the first domain name server to be replaced by the second domain name server as the authoritative server associated with the domain name.

18. The method of claim 15, further comprising:
performing a bit-wise or character-wise comparison of the first and second security records;
determining whether the first and second security records at least substantially match each other based on the bit-wise or character-wise comparison; and
in response to determining that the first and second security records do not at least substantially match each other, maintaining the first domain name server as the authoritative server associated with the domain name.

19. The method of claim 15, further comprising:
determining a first IP address associated with the first domain name server and a second IP address associated with the second domain name server based on first and second security query records associated with the first and second domain name servers, respectively; and
wherein transmitting the first and second security queries includes transmitting first and second security queries to the first and second IP addresses, respectively.

20. The method of claim 15, further comprising:
determining whether a first IP address is associated with the first domain name server and a second IP address is associated with the second domain name server based on first and second security query records associated with the first and second domain name servers, respectively;
in response to determining that the first or second IP address is not associated with the first or second domain name server, recursively resolving the first or second domain name server to determine the first or second IP address; and
wherein transmitting the first and second security queries includes transmitting first and second security queries to the first and second IP addresses, respectively.

* * * * *